(12) United States Patent
Ronda

(10) Patent No.: US 11,415,159 B2
(45) Date of Patent: Aug. 16, 2022

(54) FRAME STRUCTURE FOR A PIECE OF FURNITURE

(71) Applicant: RONDA S.P.A., Zane' (IT)

(72) Inventor: Giovanni Ronda, Thiene (IT)

(73) Assignee: RONDA S.P.A., Zane (IT)

( * ) Notice: Subject to any disclaimer, the term of this patent is extended or adjusted under 35 U.S.C. 154(b) by 21 days.

(21) Appl. No.: 16/957,149

(22) PCT Filed: Dec. 28, 2018

(86) PCT No.: PCT/IB2018/060692
§ 371 (c)(1),
(2) Date: Jun. 23, 2020

(87) PCT Pub. No.: WO2019/130263
PCT Pub. Date: Jul. 4, 2019

(65) Prior Publication Data
US 2020/0362898 A1 Nov. 19, 2020

(30) Foreign Application Priority Data
Dec. 29, 2017 (IT) .......................... 102017000151224

(51) Int. Cl.
*F16B 12/52* (2006.01)
*A47B 47/00* (2006.01)
(Continued)

(52) U.S. Cl.
CPC .......... *F16B 12/52* (2013.01); *A47B 47/0041* (2013.01); *A47B 47/027* (2013.01);
(Continued)

(58) Field of Classification Search
CPC ...... F16B 12/50; F16B 12/52; A47B 47/0041; A47B 47/027; A47B 57/408; A47B 96/1433; A47B 96/1441
See application file for complete search history.

(56) References Cited

U.S. PATENT DOCUMENTS 1,473,817 A    11/1923   Gorsline
2,962,170 A * 11/1960   Best ..................... A47B 47/027
                                                                                                                                              211/182
(Continued)

FOREIGN PATENT DOCUMENTS

DE    1907697 A1 *   8/1970   .............. F16B 12/52
DE    2526908 A1 *   1/1976   .............. B25H 3/00
(Continued)

OTHER PUBLICATIONS

International Preliminary Report on Patentability and Written Opinion in PCT/IB2018/060692 dated Jun. 30, 2020.

*Primary Examiner* — Stanton L Krycinski
(74) *Attorney, Agent, or Firm* — Volpe Koenig

(57) ABSTRACT

A frame structure (100) for a piece of furniture comprising struts (1) which are capable of forming legs (101) of the piece of furniture, cross-pieces (2) which connect, in accordance to a grid-like structure, the struts (1), and connection means (300) which are configured to join the struts (1) and the cross-pieces (2), wherein the connection means (300) comprise at least two bent extensions (21, 22) which are capable of engagement in corresponding seats (11, 12) which are formed in the strut (1) and in the cross-piece (2), respectively, or vice versa, and further comprising a fixing element (3) which includes an abutment surface (30), a threaded seat (31) and a corresponding screw (4) which has a head (40) which is capable of an approach movement towards/withdrawal movement from the abutment surface (30) by means of screwing in the threaded seat (31), the fixing element (3) being configured in such a manner that the abutment surface (30) and the head (40) of the screw (4) abut the strut (1) and the cross-piece (2), respectively, or vice versa, as a result of the mutual approach/withdrawal movement.

7 Claims, 3 Drawing Sheets

(51) Int. Cl.
*A47B 47/02* (2006.01)
*A47B 57/40* (2006.01)
*A47B 96/14* (2006.01)
*F16B 12/50* (2006.01)

(52) U.S. Cl.
CPC ........ *A47B 57/408* (2013.01); *A47B 96/1433* (2013.01); *A47B 96/1441* (2013.01); *F16B 12/50* (2013.01)

(56) References Cited

U.S. PATENT DOCUMENTS

| | | | | |
|---|---|---|---|---|
| 2,999,570 | A * | 9/1961 | Seiz | A47B 57/50 403/13 |
| 3,045,834 | A * | 7/1962 | Seiz | A47B 57/50 211/191 |
| 3,580,620 | A * | 5/1971 | Offenbroich | F16B 7/0466 403/239 |
| 3,625,372 | A * | 12/1971 | MacKenzie | A47B 57/408 211/191 |
| 3,647,079 | A * | 3/1972 | Ohlin | A47B 57/402 211/192 |
| 4,004,856 | A * | 1/1977 | Wesseler | A47B 57/40 403/186 |
| 4,285,436 | A * | 8/1981 | Konstant | A47B 57/482 211/192 |
| 4,352,587 | A * | 10/1982 | Milz | A47B 57/40 403/252 |
| 4,406,374 | A * | 9/1983 | Yedor | A47B 57/40 211/192 |
| 4,712,286 | A * | 12/1987 | Wolf | A47B 57/40 138/160 |
| 4,934,858 | A * | 6/1990 | Beaulieu | F16B 12/40 403/174 |
| 5,377,851 | A * | 1/1995 | Asano | A47B 47/022 211/191 |
| 6,223,916 | B1 | 5/2001 | Enos | |
| 6,820,758 | B2 * | 11/2004 | May | A47B 57/402 211/192 |
| 6,920,831 | B2 * | 7/2005 | Lin | A47B 57/40 108/107 |
| 6,926,378 | B2 * | 8/2005 | Greenwald | H05K 7/1421 312/223.1 |
| 7,255,409 | B2 * | 8/2007 | Hu | A47B 88/43 211/26 |
| 8,074,584 | B2 * | 12/2011 | Collins | F16B 12/52 108/156 |
| 8,196,758 | B2 * | 6/2012 | Lee | A47B 47/03 211/26 |
| 8,234,983 | B2 | 8/2012 | Randolph | |
| 8,322,668 | B2 * | 12/2012 | Tang | H05K 7/1489 248/222.14 |
| 9,888,770 | B1 * | 2/2018 | Chen | A47B 57/40 |
| 9,961,995 | B2 * | 5/2018 | Kam | A47B 47/028 |
| 10,206,506 | B1 * | 2/2019 | Lai | A47B 96/1433 |
| 10,299,588 | B1 * | 5/2019 | Lai | A47B 87/0223 |
| 10,299,589 | B1 * | 5/2019 | Lai | A47B 96/145 |
| 10,368,639 | B1 * | 8/2019 | Lai | A47B 96/1433 |
| 11,118,617 | B1 * | 9/2021 | Isensee | F16B 12/52 |
| 2007/0062898 | A1 * | 3/2007 | Choi | A47B 57/408 211/192 |

FOREIGN PATENT DOCUMENTS

| | | | | |
|---|---|---|---|---|
| DE | 3918793 | A1 * | 12/1990 | ........... A47B 47/027 |
| DE | 29617219 | U1 * | 11/1996 | ........... A47B 57/402 |
| DE | 29714840 | U1 * | 1/1998 | ........ A47B 96/1441 |
| DE | 29619688 | U1 * | 3/1998 | ........... A47B 57/408 |
| DE | 202008015827 | U1 | 4/2009 | |
| DE | 202013102937 | U1 * | 10/2014 | .............. F16B 12/44 |
| EP | 0012209 | A1 | 6/1980 | |
| EP | 1736075 | A1 * | 12/2006 | ......... A47B 57/408 |
| FR | 1388765 | A | 2/1965 | |
| FR | 2047509 | A5 * | 3/1971 | ........ A47B 96/1441 |
| FR | 2180199 | A5 * | 11/1973 | .............. F16B 12/52 |
| FR | 2299834 | A1 * | 9/1976 | ................ F16B 7/22 |
| FR | 2584584 | A1 * | 1/1987 | .............. F16B 12/52 |
| GB | 1366205 | A * | 9/1974 | ............. A47B 57/40 |
| IT | VI920166 | A1 * | 4/1994 | ........... A47B 47/027 |

* cited by examiner

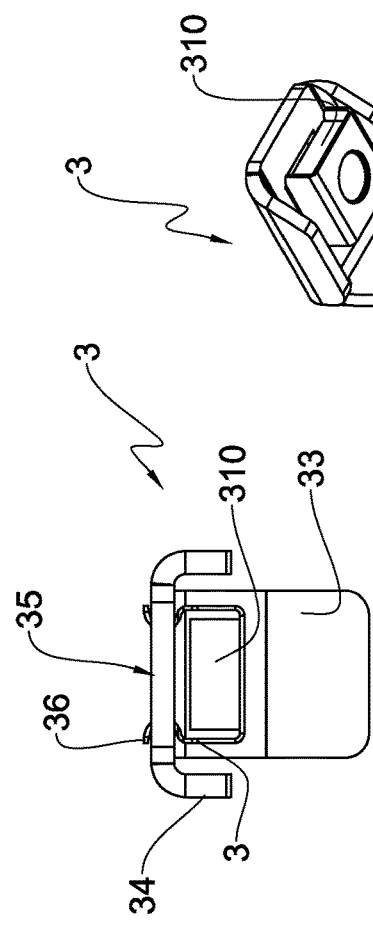
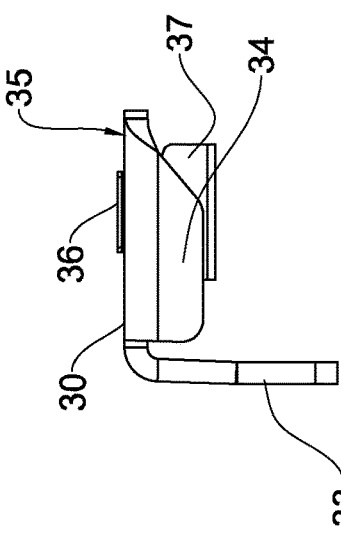
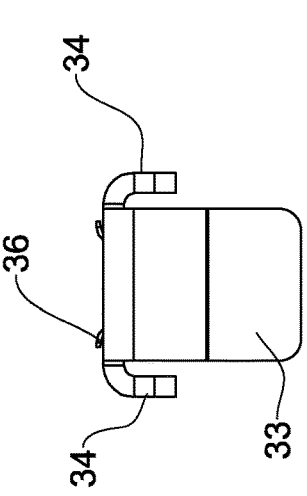
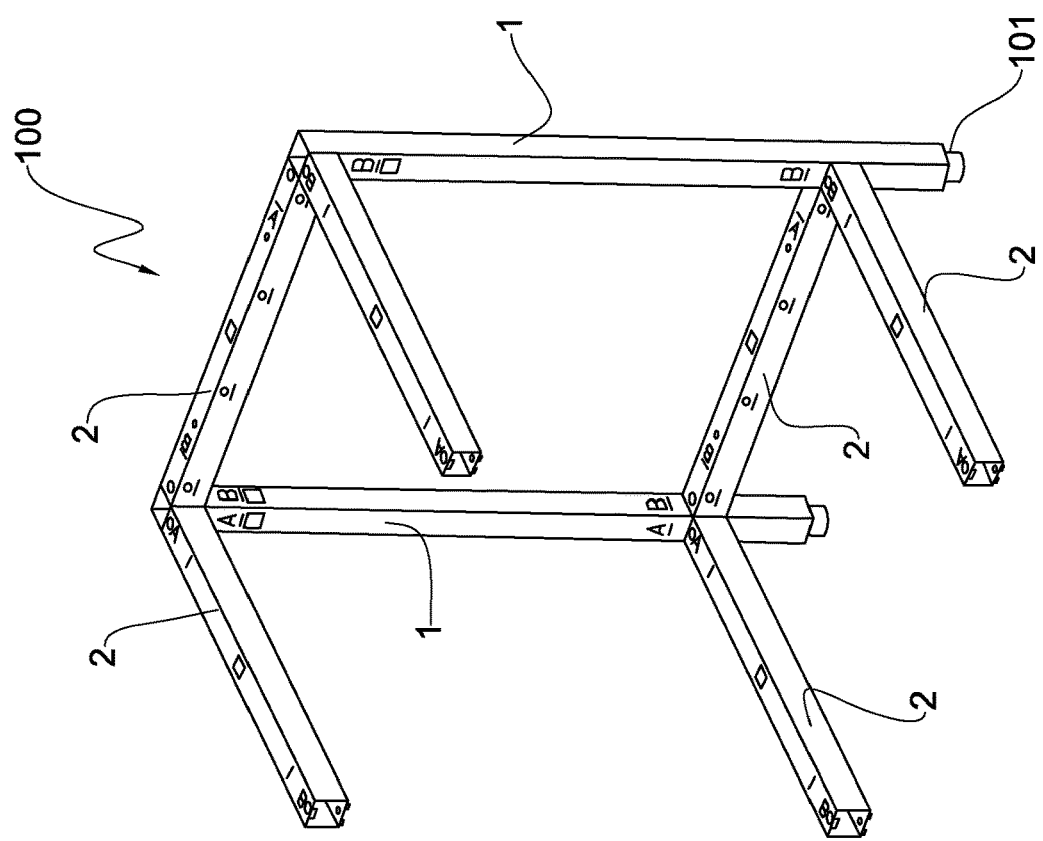

FRAME STRUCTURE FOR A PIECE OF FURNITURE

The present invention relates to a frame structure for a piece of furniture of the type comprising struts and cross-pieces joined in a grid-like configuration.

In the field of the furnishing, it is known to use tubes of metal for producing frame structures which are intended to be used in pieces of furniture of different types.

For example, the German utility model DE 202008015827 discloses a piece of furniture which has a structure which is formed by a series of tubes which are joined by means of a connection element which receives the end thereof.

However, the need to provide a specific connection element between the various components makes the assembly complex and requires additional components which inevitably increase the production costs and require appropriate storage.

Another solution is described in U.S. Pat. No. 1,473,817 which relates to a frame for pieces of furniture which comprises struts and cross-pieces which are joined by means of an interlocking system which is formed by tongues which can be inserted in respective seats which are present on the strut and cross-piece, respectively.

Although this solution is structurally simpler than the preceding one, it is less stable and can be inadvertently disengaged.

Furthermore, if it were desirable to provide an interlocking joint which is more stable by providing a greater interference-fit between the tongues and seats, this would inevitably make the assembly more complex.

Therefore, the technical problem addressed by the present invention is to provide a frame structure for pieces of furniture which allows one or more of the disadvantages mentioned above with reference to the prior art to be overcome.

This problem is solved by the frame structure for pieces of furniture according to claim 1. The present invention has a number of relevant advantages. In fact, provision is made for the use of a fixing element between struts and cross-pieces which allows the production of a stable connection, since it can be blocked by tightening a suitable screw.

The fixing element is further preferably part of connection means which further provide for seats and bent extensions which can be received therein and which allow struts and cross-pieces to be blocked in a direction of withdrawal movement away from each other.

This combination therefore allows the connection between struts and cross-pieces to be made particularly stable because the bent extensions cannot be disengaged from the relevant seats unless the screw of the fixing element has been released beforehand.

In addition, the struts and the cross-pieces used in the present invention can be formed simply, complex mechanical processing operations not being required for the production thereof.

According to a preferred embodiment, the struts and cross-pieces are formed by tubular elements, for example, with a square cross-section.

Preferably, the bent extensions are formed on cross-pieces and the seats are formed on the strut.

According to another aspect, the fixing element is L-shaped so as to allow it to be inserted in a suitable recess which is formed in the strut.

These features allow the fixing element to be positioned initially and the interlocking between bent extensions and seats to be subsequently carried out.

Furthermore, as a result of providing the recess for the fixing element on the strut, by positioning it in a projecting manner thereon, it is possible to make the positioning thereof particularly simple, it not being necessary to operate in zones which can be reached only with difficulty.

Preferably, in order to position the fixing element in a precise manner and also to keep it stable during the assembly step, it comprises support flanks which are capable of resting on the strut or on the cross-piece.

In one embodiment, the fixing element comprises a first portion which is capable of insertion in the relevant recess and a second portion which is preferably perpendicular to the first portion and which forms the abutment surface which is intended to abut the strut or cross-piece, allowing the above-mentioned connection.

According to another aspect, the fixing element is L-shaped.

Preferably, the first portion and the second portion perpendicular thereto are defined by means of the L-shaped development.

According to another aspect, the recess is in the form of a slot, the first portion having a length which is greater than the height of the slot.

In this manner, when the second portion of the L is inserted in the slot, the withdrawal of the fixing element from the recess is prevented or in any case made extremely difficult.

According to yet another aspect, the threaded seat in which the fixing screw engages is formed on a floating member which is configured so as to be able to carry out limited translation movements with respect to the abutment surface of the fixing element. It is thereby possible to compensate for any positioning errors or dimensional errors in the structure of the strut and the cross-piece.

Other advantages, features and the methods for use of the present invention will be better appreciated from the following detailed description of some embodiments which are set out by way of non-limiting example. Reference will be made to the Figures of the appended drawings in which:

FIG. 3 is a perspective view of the frame structure for pieces of furniture according to the present invention;

FIGS. 4A to 4D are a front view, perspective view, side view and rear view of a fixing element, respectively, a detail of the structure of FIG. 1;

Figures 1, 2:
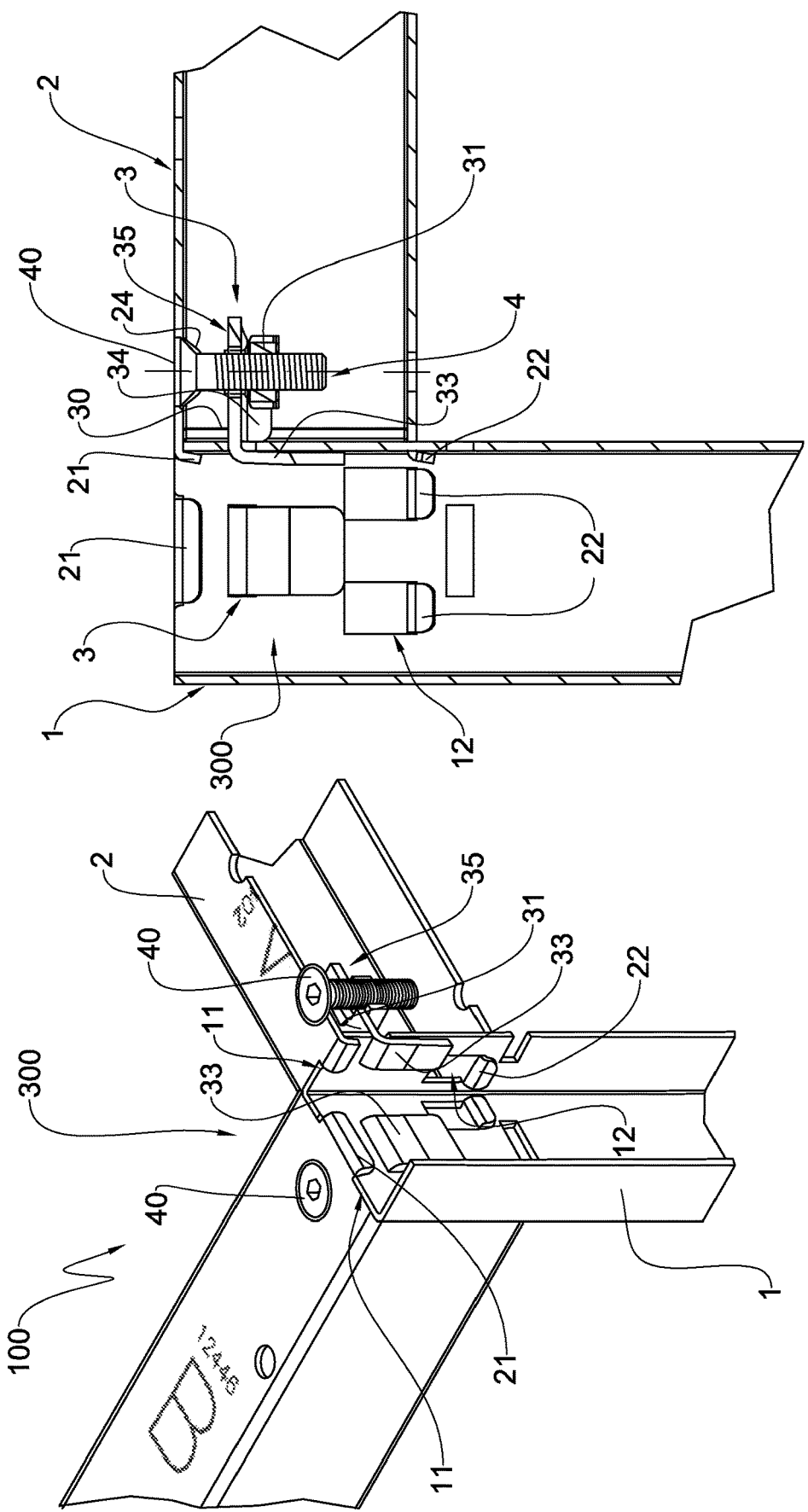
FIG. 1 is a perspective, partially sectioned view of a detail of the frame structure for pieces of furniture according to the present invention.
FIG. 2 is a lateral cross-section of the structure of FIG. 1.

Initially with reference to FIGS. 1 to 3, a frame structure 100 for a piece of furniture is generally designated 100. The structure 100 comprises struts 1 which form the legs 101 of the piece of furniture and cross-pieces 2 which connect the struts 1 according to a grid-like structure. According to a preferred embodiment, both the struts and the cross-pieces are formed by means of tubular elements, for example, constructed from steel or another suitable metal.

As can be seen in FIG. 3, there may be provided upper and lower cross-pieces which connect the struts in the region of two different vertical positions. In any case, it will be appreciated that the structure according to the present invention allows the production of a modular structure, providing a plurality of different combinations in accordance with the specific requirements.

Now with particular reference to FIGS. 1 and 2, the structure 100 further comprises connection means 300 which are configured to join the struts 1 to the cross-pieces 2.

Figure 6:
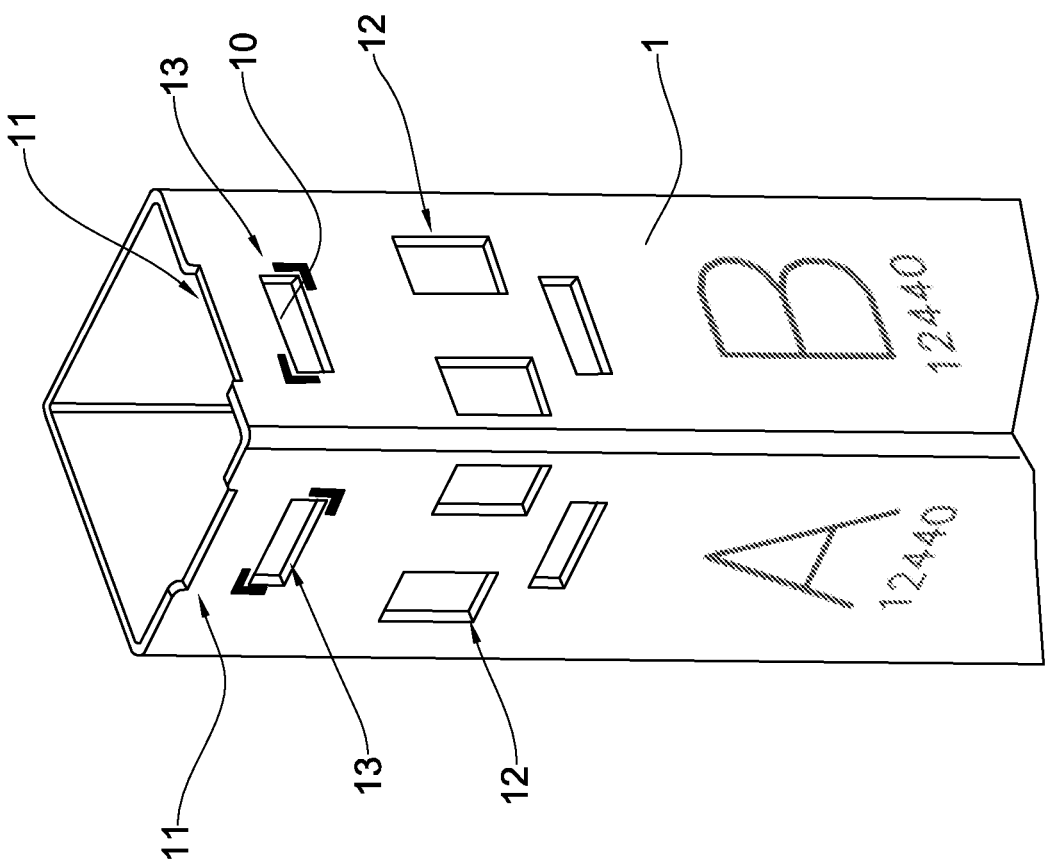
FIG. 6 is a perspective view of a strut of the frame structure according to the present invention.
Figure 5:
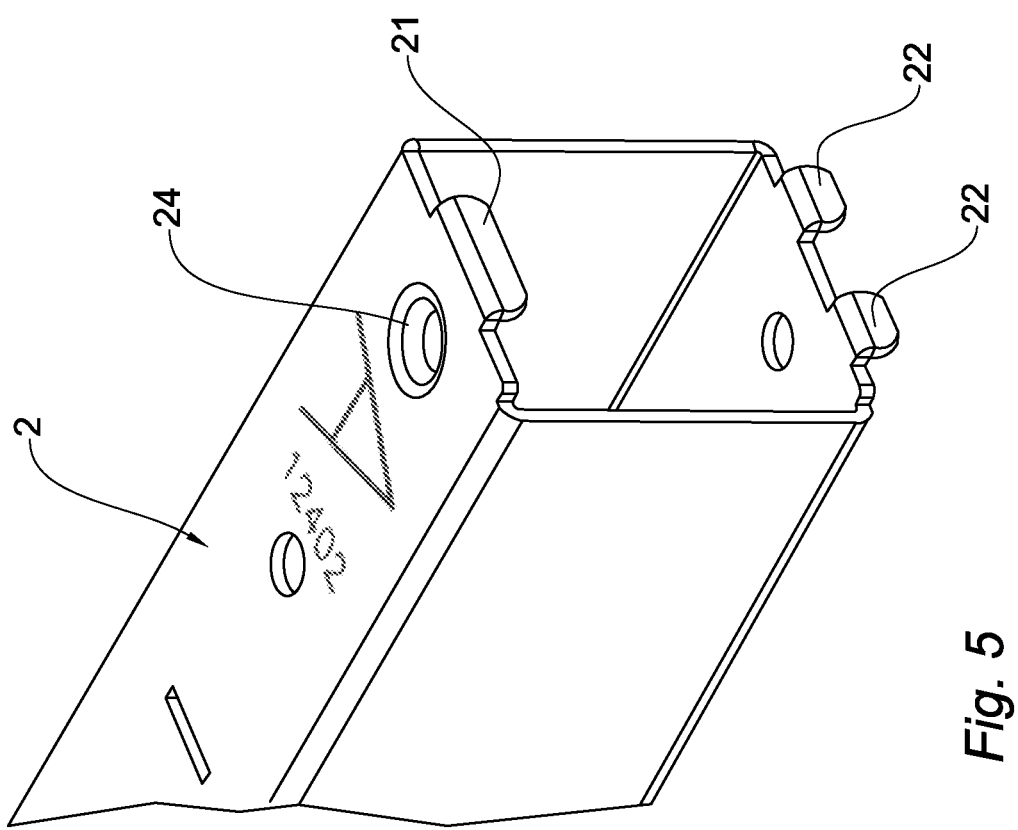
FIG. 5 is a perspective view of a cross-piece of the frame structure according to the present invention.

In an embodiment, the connection means 300 comprise at least two bent extensions 21, 22 which are formed on the cross-piece 2 and which are better illustrated in FIG. 5, and corresponding seats 11, 12 which are formed in the strut 1, on the other hand, as can be seen in FIG. 6. It is in any case evident that the opposite solution could also be provided, with seats being formed in the cross-piece and extensions being formed on the strut.

Preferably, the bent extensions 21 and 22 are formed by means of a tongue which is bent downwards and which extends from the surface of the cross-piece 2. In the embodiment in which the cross-piece 2 is formed by a hollow tubular element, the bent extensions 21, 22 are formed in the region of an open end of the cross-piece 2.

In an embodiment, there is provided an upper bent extension 21 and one, preferably two, lower bent extension(s) 22.

It is evident that, in the context of the present invention, the term "upper/lower", similarly to the term "high/low", relates to the vertical direction defined by the piece of furniture to which the structure of the present invention is applied during normal use.

There is further defined on the cross-piece 1 a corresponding upper seat 11 and lower seat(s) 12, in which the corresponding extensions engage.

Preferably, the upper seat 11 is formed by a chamfer which is formed at an upper end of the strut 2.

In this manner, the engagement between extensions and seats can be obtained in a particularly simple manner, it being simply necessary to rest the extension in the region of the chamfer.

Always for the benefit of ease of assembly, the lower seat 12 forms an opening having an area greater than the corresponding bent extension 22.

As can be understood from FIG. 2, the bent extensions 21, 22 are configured so as to engage on the corresponding seats 11, 12 which are formed on the strut 1 and to prevent movement away from each other between the strut and cross-piece in the axial direction of the cross-piece 2.

In order also to obtain a stable connection between the strut and the cross-piece in a vertical direction, the fixing means 300 of the frame structure according to the present invention further comprise a fixing element 3, which is illustrated in detail in FIGS. 4A-4D and which can be engaged in a respective recess 13, which is preferably formed in the strut 1.

In an embodiment, the fixing element 3 is L-shaped, with a portion 33 of the L being able to be inserted inside the recess 13 and the other portion 35 which projects from the strut 1 in an overhanging manner. According to an aspect of the invention, in order to prevent the fixing element 3 from inadvertently being able to be removed from the recess 13, it is constructed in the form of a slot. The height of this slot, i.e. the opening of the slot in the vertical direction, is smaller than the first portion 33 of the fixing element 3.

In order to fix the fixing element 3 in position once it has been inserted in the recess 13, there may further be provided support flanks 34 which are capable of resting on the strut 1, as can be seen in FIG. 2. In particular, the wall of the strut 1 is closed in a packet-like manner between the first portion 33 and the support flanks 34. Preferably, the support flanks 34 extend at 90° with respect to the second portion 35 of the fixing element 3.

A surface 30 which is capable of abutting a support surface 10 which is defined in the recess 13 is defined on the second portion 35 of the fixing element.

The fixing element 3 further comprises a threaded seat 31, in which there can be inserted a corresponding screw 4 which has a head 40. In an embodiment, the threaded seat 31 is formed on a floating member 310 which is configured so as to be able to carry out limited translation movements with respect to the abutment surface 30, in particular in a plane parallel to the abutment surface 30 itself.

The floating member 310 can be received in a receiving member 37 which can be fixed by means of a joint 36 on the second portion 35 of the fixing element 3.

During the assembly of the frame structure of the present invention, the fixing element 3 is initially fixed on the strut 1 by inserting it in the respective recess 13.

Subsequently, the cross-pieces 2 are fixed to the strut 1 by engaging the bent extensions 21, 22 with the respective seats 11, 12.

The blocking of the structure is therefore brought about by screwing the screw 4, which is received in a screw seat 24 which is formed in the cross-piece 2, in the respective threaded seat 31. Preferably, the head 40 and the respective seat 24 have a conical shape.

The head 40 of the screw 4 and the abutment surface are capable of a movement towards/away from each other when the screw 4 is screwed in the seat 31. Consequently, when the screw 4 is screwed, the head 4 urges the cross-piece 2 downwards by acting on the screw seat 24 and the abutment surface 30 urges the strut 1 in the opposite direction, acting on the abutment surface 10.

More generally, different configurations for the fixing element 3 could also be used because the abutment surface 30 and the head 40 of the screw 4 abut the strut 1 and the cross-piece 2, respectively, or vice versa, following the mutual approach/withdrawal movement generated by the screw 4 being screwed. In this manner, the strut and the cross-piece will be secured in the vertical direction. This securing, combined with the interlocking previously described thereby allows the frame structure of the present invention to be made stable.

It is evident that the above-described configuration could be used for each connection between the strut 1/cross-piece 2 of the structure. For example, if necessary, connection means 300 could be present in the region of at least two vertically staggered portions of the strut 1, as illustrated in FIG. 3.

Therefore, it is evident that the frame structure solves the problems identified with reference to the present invention, providing for the use of simple components and requiring only the use of a threaded connection.

The invention claimed is:

1. A frame structure (100), for a piece of furniture, comprising:
   struts (1), which are capable of forming legs (101) of the piece of furniture,
   cross-pieces (2) which connect, in accordance to a grid structure, the struts (1),
   connection means (300) which are configured to join the struts (1) and the cross- pieces (2), wherein the connection means (300) comprise at least two bent extensions (21, 22), formed on the strut (1) or on the cross piece (2), which are capable of engagement in corresponding seats (11, 12) which are formed in the strut (1)

or in the cross-piece (2), respectively, the connection means further comprising a fixing element (3) which includes an abutment surface (30), a threaded seat (31) and a corresponding screw (4) which has a head (40) which is capable of an approach movement towards/withdrawal movement away from the abutment surface (30) by means of rotation in the threaded seat (31), the fixing element (3) being configured in such a manner that the abutment surface (30) and the head (40) of the screw (4) abuts the strut (1) or the cross-piece (2), respectively, as a result of the mutual approach/withdrawal movement, and a recess (13) in the strut (1) or the cross-piece (2), inside which a portion of the fixing element (3), in which the abutment surface (30) is defined, is received, wherein the fixing element (3) comprises a first portion (33) which is insertable in the recess (13) and a second portion (35) which is perpendicular to the first portion (33) and which defines the abutment surface (30) and wherein the recess (13) is in the form of a slot, the first portion (33) having a length which is greater than a height of the slot.

2. A frame structure (100) according to claim 1, wherein the fixing element (3) comprises at least one support flank (34) which is capable of support on the strut (1) or on the cross-piece (2).

3. A frame structure (100) according to claim 1, wherein at least one of the seats (11, 12) forms an opening having an area greater than a respective bent extension (21, 22).

4. A frame structure (100) according to claim 1, further comprising an upper seat (11) and a lower seat (12), the upper seat (11) being formed by a chamfer which is formed at an upper end of the cross-piece (1) or the strut (2).

5. A frame structure (100) according to claim 1, wherein the threaded seat (31) is formed on a floating member (310) which is configured to carry out limited translation movements with respect to the abutment surface (30).

6. A frame structure (100) according to claim 1, wherein the cross-piece (2) is formed by a hollow tubular element, the bent extensions (21, 22) are formed at an open end of the cross-piece (2).

7. A frame structure (100) according to claim 1, wherein the cross-piece (2) comprises a screw seat (24) which is configured to receive the head (40) of the screw (4).

* * * * *